Feb. 11, 1958 W. H. WILLIAMS 2,822,831
AUTOMATIC STOP FOR BATTERY FILLING DEVICE
Filed June 4, 1953 3 Sheets-Sheet 1
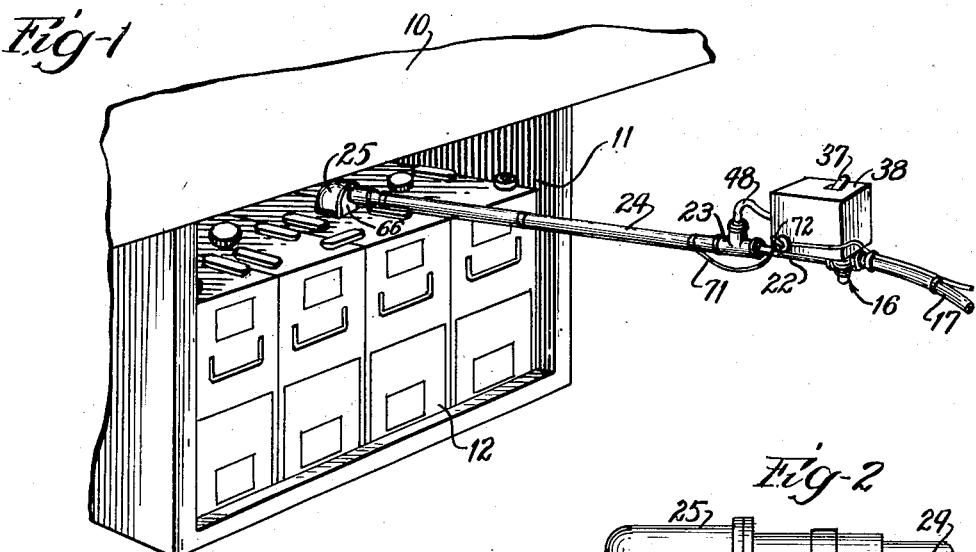
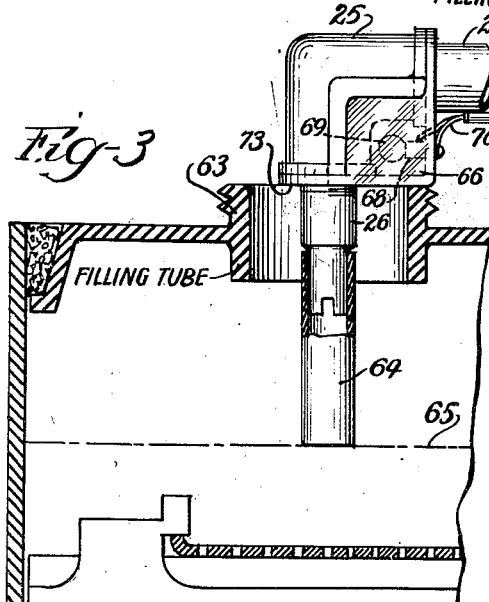
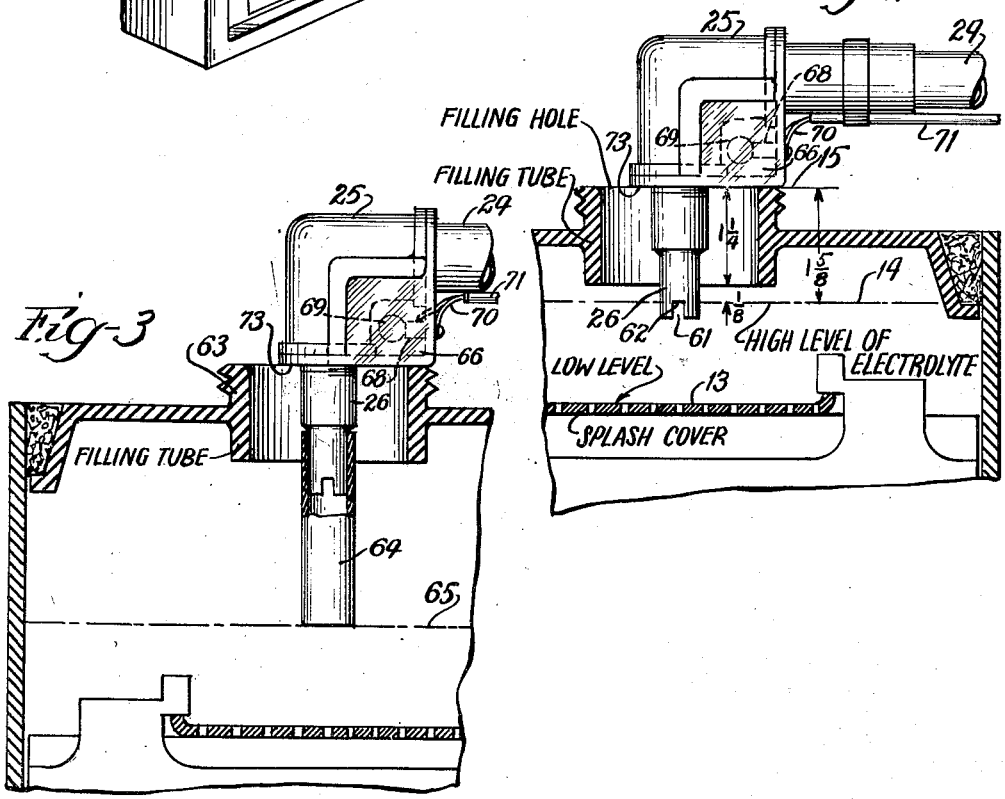
INVENTOR.
Wyatt H. Williams
BY
Mann, Brown and Hausmann
Attys Feb. 11, 1958  W. H. WILLIAMS  2,822,831
AUTOMATIC STOP FOR BATTERY FILLING DEVICE
Filed June 4, 1953  3 Sheets-Sheet 2

INVENTOR.
Wyatt H. Williams
BY
Mann, Brown and Hansmann
Attys.

Feb. 11, 1958 W. H. WILLIAMS 2,822,831
AUTOMATIC STOP FOR BATTERY FILLING DEVICE
Filed June 4, 1953 3 Sheets-Sheet 3
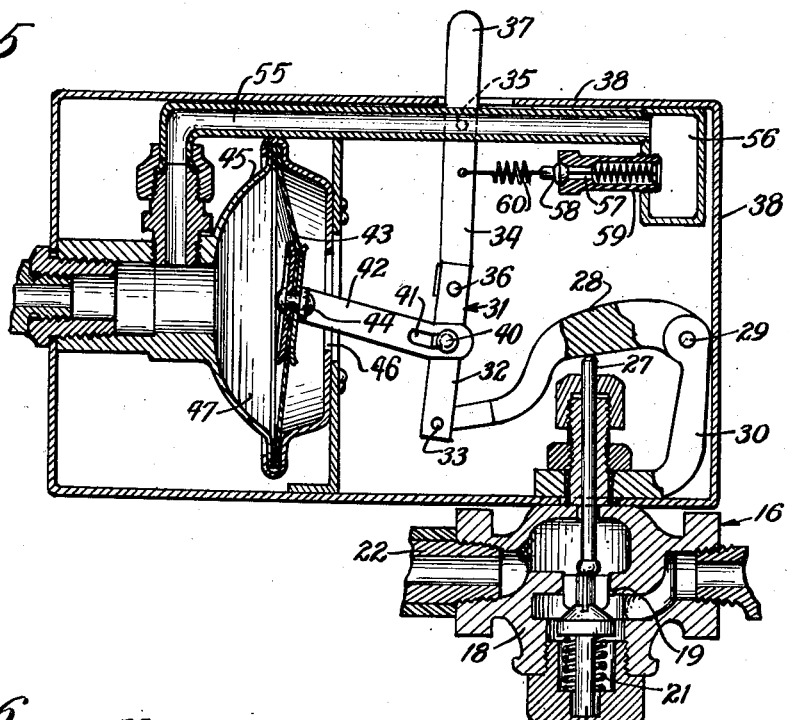
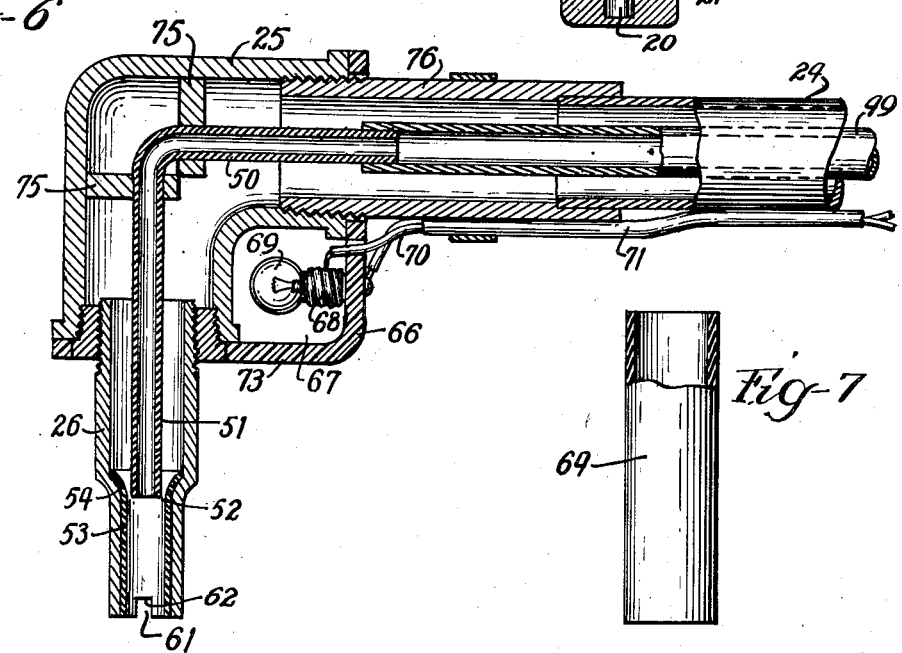
INVENTOR.
Wyatt H. Williams
BY
Mann, Brown and Hansmann
Attys.

United States Patent Office 2,822,831
Patented Feb. 11, 1958

2,822,831

AUTOMATIC STOP FOR BATTERY FILLING DEVICE

Wyatt H. Williams, Gurnee, Ill., assignor to Gould-National Batteries, Inc., a corporation of Delaware Application June 4, 1953, Serial No. 359,493

5 Claims. (Cl. 141—209)

This invention relates to vehicle battery filling devices with liquid level automatic flow stop. Its principal object is to make the liquid in the battery cell automatically stop the input when it nears or reaches the desired level.

Generally speaking, this is accomplished by providing a toggle for opening and latching a spring-seated, normally closed liquid supply valve and a vacuum means subject to the action of the input battery liquid to unlatch the toggle when the rising liquid in the battery cell cuts off the vacuum means from atmospheric pressure through the filling opening in that cell.

The preferred embodiment of the invention is shown in the accompanying drawings, in which:

Fig. 1 is a perspective view of the battery filling device associated with a battery in a compartment below a railway car;

Fig. 2 is a section through the upper portion of the cell of a lead type battery with the delivery end of the battery filling device in place for charging the cell with water;

Fig. 3 is a similar view of the upper portion of a cell of an Edison type and the delivery end of the battery filling device;

Fig. 5 is a section similar to Fig. 4 showing the supply valve in open position;

Fig. 6 is a detailed section through the delivery end of the battery filling device; and Fig. 7 is an elevation, partly in section, of an extension to the nozzle for use with Edison type cells.

Figure 4:
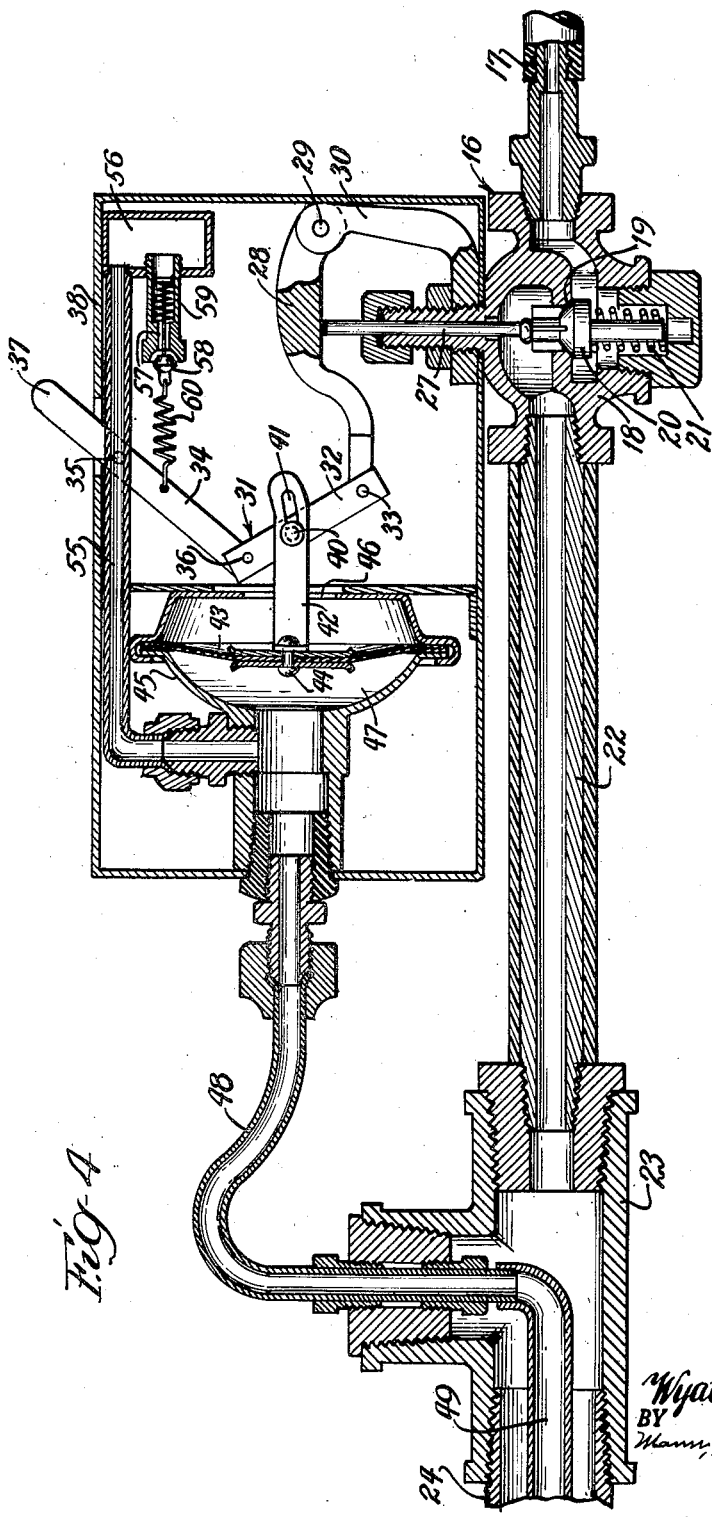
Fig. 4 is a section through the supply valve and associated parts with the valve closed.

But these specific drawings and the corresponding description are for the purpose of illustrative disclosure only, and are not intended to impose unnecessary limitations on the claims.

In Fig. 1, 10 indicates a portion of a railroad car having a battery compartment 11 for a battery 12, which may include 16 to 88 cells in practice.

In the normal course of maintenance of batteries for railroad cars, the supply of approved water must be renewed from time to time and the actual level of the electrolyte maintained between set upper and lower limits.

For example, in the lead type cell, shown in Fig. 2, the low level is the top of the splash plate 13; and the high level is indicated by the line 14, 1/8" below the bottom of the filling tube 15.

The filling device embodying this invention includes a valve generally indicated by 16 (Fig. 4) connected with a source of supply indicated by a hose 17.

The valve 16 includes a casing 18 having a valve seat 19 for a valve 20 normally held seated by a spring 21. The casing 18 is connected by pipe 22 with a large T 23, which, in turn, is connected by a pipe 24 with an L 25, fitted with a filling or delivery nozzle 26 adapted to be inserted in the filling tube 15, as indicated in Fig. 2.

The various pieces of piping are connected by devices familiar in plumbing and pipe fitting, and it is not thought necessary to extend the description by going into detail.

Means for opening the valve 16 and latching it in open position is illustrated best in Figs. 4 and 5. It includes a push rod 27 fitted into the upper portion of the valve casing 18 for reciprocating movement to urge the valve 20 downwardly against the spring 21 when water is to be supplied to a cell.

The push rod is operated by a lever 28 fulcrumed at 29 on the standard 30.

The lever 28 is swung downwardly to open the valve 20, and is latched in that position by a toggle generally indicated by 31 and including a lower bar 32 fulcrumed at 33 on the free end of the lever 28 and an upper bar 34 fulcrumed at a fixed point 35 and pivoted to the lower bar 32 at 36. The upper bar 34 is extended at 37 through a cabinet 38 to provide an operating lever accessible from the outside of the cabinet.

A comparison of Figs. 4 and 5 will indicate clearly that, when the toggle is swung by the lever 37 from the bent position in Fig. 4 to the past center position in Fig. 5, the valve 16 is opened and latched, and water may flow freely through the device and out through the nozzle 26.

In order to swing the toggle 31 back through center and permit the spring 21 to close the valve 20, the toggle bar 32 is connected by a pin 40 and a slot 41 with a link 42 having the end opposite the slot 41 fixed to a diaphragm 43 at 44.

The diaphragm is mounted in a suitable casing 45 open at the right in Figs. 4 and 5 to atmospheric pressure through a passage 46.

The closed side 47 of the diaphragm casing is connected through a gooseneck 48 running through the T 23, and connected by a pipe 49 with an elbow 50 inside the elbow 25 and having an air tube 51 telescoped within the nozzle 26 with liquid flow clearance 52 providing for an annular or hollow stream of water through the lower portion of the nozzle 26 represented by the nozzle tube 53 having a constriction 54 adjacent to the end of the air tube 51.

Again, the various connections are familiar to plumbing and pipe fitting, and detailed description is omitted in the interest of brevity.

In operation, the filling device is connected with a source of approved water by a hose 17, as indicated in Fig. 4; the cap of a cell is removed; and a nozzle is inserted as indicated in Figs. 1 and 2. The lever 37 is swung from the position shown in Fig. 4 to that shown in Fig. 5, the effect of which is to swing the lever 28 downwardly and make the push rod 27 open the valve 20 against the spring 21 and swing the toggle 31 to the past center position shown in Fig. 5, in which the pin 40, acting against the end of the slot 41, biases the diaphragm 43 from the position shown in Fig. 4 to that shown in Fig. 5.

Water flows through the piping, and is delivered through the annular space 52 in a stream passing through the nozzle tube 53 into the cell.

The stream of water passing the end of the air tube 51 breaks up and tends to entrain air in the tube 51, and thus reduce the pressure in the air tube below normal atmosphere. However, the tendency is promptly overcome by the fact that the relevant space within the air tube and the nozzle tube is in free and open communication with the atmosphere through the filling hole in the filling tube of the cell. As the water level rises in the cell and approaches the lower end of the nozzle tube 53, the free communication with the atmosphere is reduced; and the stream of water effects a reduction in pressure in the air tube 51. When that reduction reaches a suitable value, atmospheric pressure on the right side of the diaphragm 43 in Fig. 5 forces the diaphragm to the left, breaking the toggle and permitting the valve spring 21 to snap the valve 20 closed.

From Fig. 2, it will be apparent that the lower end of the nozzle tube is at a certain definite distance from the top of the filling tube 15—in this instance, 1⅝″ from the top of that tube. The result is that filling each cell of a battery with the instrument brings the high level of the electrolyte 14 to exactly the desired maximum, and no more. In the instance shown in Fig. 2, that high level of electrolyte is ⅛″ below the bottom of the filling tube 15.

An unavoidable incident of this operation is that gradually water will tend to build up in the air tube 51. To prevent any considerable accumulation in that tube, the closed side 47 of the diaphragm chamber 45 is connected by a pipe 55 with a vent chamber 56 having a vent orifice 57 controlled by a valve 58 normally closed by a spring 59. In detail, this vent valve is an ordinary "Schrader valve inside" familiar to pneumatic tubes.

The valve 58 is connected with the upper bar 34 of the toggle 31 by a spring 60, as a result of which each time the toggle moves to the bent position shown in Fig. 4 the vent valve 58 is opened, and any water that has risen in the air tube 51 will descend by gravity.

It has been found in practice that the cut-off is sharpened and the high level of electrolyte limited most sharply by providing a lateral opening or openings in the delivery end of the nozzle tube 53, shown in this illustration by a notch 61.

The relation between the outside diameter of the air tube 51 and the inside diameter of the nozzle tube 53 appears to be critical and related to the top of the notch 61. In a form that has been found satisfactory in practice, the outside diameter of the air tube 51 is ¼″; the inside diameter of the nozzle tube 52 is 9/32″; and the distance from the lower end of the air tube 51 to the upper end of the notch 62 is ¾″.

In the Edison type of battery shown in Fig. 3, the desired level for the electrolyte is 3″ below the top of the filling tube.

When the filling device is to be used with that type of battery, the nozzle is in effect extended by slipping a thin walled rubber tube 64 (Figs. 3 and 7) over the nozzle 26, and in effect extending that nozzle to the desired level of the electrolyte indicated by the line 65.

As will be seen in Fig. 1, the filling tube of a cell is well within the battery compartment, and is often in shadow or darkness when the filling operation is to be performed. For that reason, the filling device is equipped at the elbow 25 (Fig. 6) with a translucent wall 66 of glass or some transparent, moldable material, such as is commonly now referred to as plastic; and there is formed a chamber 67 fitted with a socket 68 for a lamp bulb 69 supplied with current through wire 70 in an insulated tube 71 along the lower side of the piping and leading to a switch 72 near the box 38.

The lower edge 73 of the wall 66 becomes a base adapted to rest on top of the filling tube and project the nozzle 26 to the correct level in the battery cell.

While a variety of materials may be used in the device, cellulose acetate butyrate molding compositions marketed by Tennessee Eastman Corporation under the name of "Tenite II" are especially good for the elbow 25, the nozzle 26, and the coupling 76. The copper elbow 50 is held in place within the elbow 25 by two blocks 75 of Tenite II welded to the inside of the elbow. The assembly within and attached to the elbow 25 forms a commercial unit usable with a great variety of apparatus other than that shown.

I claim:

1. In a vehicle battery filling device with liquid level automatic flow stop, a normally closed liquid supply valve, resilient means urging the valve to closed position, a liquid delivery nozzle operatively connected with the liquid supply valve, means for opening the valve and latching it into open position including a toggle and an operating handle connected with the toggle to swing it from bent through straight position, a diaphragm operatively connected with the toggle, a casing for the diaphragm open to atmosphere at one side and closed at the other, an air tube telescoped within the nozzle with liquid flow clearance between them and ending within the nozzle near the delivery end thereof, and means including an air passage connecting the diaphragm chamber with the air tube, said nozzle having a construction adjacent to the end of the air tube.

2. In a vehicle battery filling device with liquid level automatic flow stop, a normally closed liquid supply valve, resilient means urging the valve to closed position, a liquid delivery nozzle operatively connected with the liquid supply valve, means for opening the valve and latching it into open position including a toggle and an operating handle connected with the toggle to swing it from bent through straight position, a diaphragm operatively connected with the toggle, a casing for the diaphragm open to atmosphere at one side and closed at the other, an air tube telescoped within the nozzle with liquid flow clearance between them and ending within the nozzle and having an air intake opening disposed to receive air from within the nozzle, means including an air passage connecting the diaphragm chamber with the air tube, said nozzle having a constriction adjacent to the end of the air tube, and a lateral opening spaced from the end of the air tube.

3. In a vehicle battery filling device with liquid level automatic flow stop, a normally closed liquid supply valve, resilient means urging the valve to closed position, a liquid delivery nozzle operatively connected with the liquid supply valve, means for opening the valve and latching it into open position including a toggle and an operating handle connected with the toggle to swing it from bent through straight position, a diaphragm operatively connected with the toggle, a casing for the diaphragm open to atmosphere at one side and closed at the other, an air tube telescoped within the nozzle with liquid flow clearance between them, means including an air passage connecting the diaphragm chamber with the air tube, means providing a vent adjacent to the closed side of the diaphragm chamber, a vent valve for the vent, and means to open the vent valve while the liquid supply valve is closed.

4. In a vehicle battery filling device with liquid level automatic flow stop, a normally closed liquid supply valve, resilient means urging the valve to closed position, a liquid delivery nozzle operatively connected with the liquid supply valve, means for opening the valve and latching it into position including a toggle and an operating handle connected with the toggle to swing it from bent through straight position, a diaphragm operatively connected with the toggle, a casing for the diaphragm open to atmosphere at one side and closed at the other, an air tube telescoped within the nozzle with liquid flow clearance between them, means including an air passage connecting the diaphragm chamber with the air tube, means providing a vent adjacent to the closed side of the diaphragm chamber, a vent valve for the vent, and means interconnecting the two valves whereby the vent valve is closed while the liquid valve is open.

5. In a vehicle battery filling device with liquid level automatic flow stop, a normally closed liquid supply valve having inlet and outlet ports, resilient means urging the valve toward closed position, a liquid delivery nozzle connected to the outlet port of said liquid supply valve, manually operable means for opening said valve, latch means for securing said valve in open position, a diaphragm operatively connected to said latch means for releasing the valve to cut off flow to said delivery nozzle, a casing for the diaphragm open to atmosphere at one side and having a normally closed chamber at the other side of the diaphragm, an air tube telescoped within said delivery nozzle with liquid flow clearance between them and ending within said nozzle near the delivery end thereof, and means including an air passage connecting said normally closed diaphragm chamber with said air tube, said nozzle having a constriction adjacent to the end of the air tube.

References Cited in the file of this patent

UNITED STATES PATENTS

| | | |
|---|---|---|
| 2,086,071 | Ehnts | July 6, 1937 |
| 2,122,705 | Welborn | July 5, 1938 |
| 2,326,251 | Piquerez | Aug. 10, 1943 |
| 2,528,697 | Logan et al. | Nov. 7, 1950 |
| 2,528,747 | Gravelle | Nov. 7, 1950 |
| 2,622,782 | Giger | Dec. 23, 1952 |
| 2,687,740 | Jarund | Aug. 31, 1954 |
| 2,714,977 | Davis | Aug. 9, 1955 |